(12) United States Patent
Yang et al.

(10) Patent No.: US 8,520,708 B2
(45) Date of Patent: Aug. 27, 2013

(54) LASER SCANNING DEVICE AND METHOD USING THE SAME

(75) Inventors: Ying-Hui Yang, Kaohsiung County (TW); Yu-Chung Lin, Tainan County (TW); Min-Kai Lee, Tainan County (TW); Sung-Ho Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 257 days.

(21) Appl. No.: 12/701,618

(22) Filed: Feb. 8, 2010

(65) Prior Publication Data

US 2011/0128979 A1    Jun. 2, 2011

(30) Foreign Application Priority Data

Dec. 1, 2009 (TW) ................................ 98141036 A

(51) Int. Cl.
*H01S 3/10* (2006.01)
(52) U.S. Cl.
USPC .............................. 372/24; 372/25; 359/212.2
(58) Field of Classification Search
USPC ........................................................... 372/24
See application file for complete search history.

(56) References Cited

U.S. PATENT DOCUMENTS

| 4,699,515 | A | | 10/1987 | Tanimoto et al. |
| 4,915,486 | A | * | 4/1990 | Hansen ............................ 349/24 |
| 5,812,299 | A | * | 9/1998 | Minakuchi et al. ......... 359/216.1 |
| 5,848,091 | A | * | 12/1998 | Mombo Caristan .......... 372/103 |
| 6,058,132 | A | * | 5/2000 | Iso et al. ........................ 372/108 |
| 6,574,024 | B1 | | 6/2003 | Liu |
| 2003/0002547 | A1 | * | 1/2003 | Lee ............................ 372/29.02 |
| 2005/0180294 | A1 | * | 8/2005 | Kimura et al. ............ 369/112.05 |
| 2006/0196852 | A1 | * | 9/2006 | Bann et al. .................. 219/121.8 |
| 2008/0069167 | A1 | * | 3/2008 | Gorton et al. .............. 372/50.12 |

* cited by examiner

*Primary Examiner* — Xinning Niu
(74) *Attorney, Agent, or Firm* — Jianq Chyun IP Office

(57) ABSTRACT

A laser scanning device and a method using the same are provided. The laser scanning device includes a laser output unit, a shape rotation unit, a scanning unit and a control unit. The laser output unit is used to output a laser beam. The shape rotation unit is disposed on a propagation path of the laser beam for rotating a spot of the laser beam by a predetermined angle. The scanning unit receives the laser beam whose spot has been rotated by the predetermined angle to scan a work piece set on a carrier unit. The control unit is set between the shape rotation unit and the scanning unit for generating the predetermined angle based on a scanning position of the scanning unit.

25 Claims, 6 Drawing Sheets

LASER SCANNING DEVICE AND METHOD USING THE SAME

CROSS-REFERENCE TO RELATED APPLICATION

This application claims the priority benefit of Taiwan application serial no. 98141036, filed on Dec. 1, 2009. The entirety of the above-mentioned patent application is hereby incorporated by reference herein and made a part of specification.

BACKGROUND OF THE INVENTION

1. Field of the Invention

The present invention relates to a laser scanning device and a method using the same.

2. Description of Related Art

Skill persons have paid much attention on laser etching technique capable of replacing a conventional chemical wet etching technique with high-pollution.

U.S. Pat. No. 6,574,024 discloses a homogenization method of a laser beam on an optical mask through a scan beam to implement laser micro-drilling. According to such patent, a homogenization module first homogenises energy of the laser beam, and then the homogenised laser beam is used to perform the micro-drilling operations through a scanning mirror. However, the laser micro-drilling technique cannot be applied for a large area stitching, and a photolithography process of a non-circular spot cannot be used.

Moreover, U.S. Pat. No. 4,699,515 discloses a method for detecting and calibrating a relative error between a photomask and a wafer during a semiconductor fabrication process. In this patent, the error calibration is performed according to a single movement or rotation, and the relative error is calibrated according to relative movement or rotation between the photomask and a carrier platform. The disclosed technique has an advantage of high stitching accuracy, though a processing speed thereof is slow, and such technique is not suitable of a scanner processing system.

A processing speed of the laser in cooperation with the photomask technique is generally unsatisfactory. Therefore, a new technique combining the photomask technique and the scanning mirror is provided. During a development process of the new technique, it is discovered that the non-circular spots of different scan areas may have a rotation phenomenon, which may lead to failure of the large area stitching. The rotation is generated due to a skew error or an angular error, etc. between the scanning mirrors, and such error belongs to a production error generated during the assembling.

Taking a scanning system of a single scanning mirror as an example, during an x-axis projection processing, a processing path is represented by an $x(\theta_x)$ function, though an error parameter $\theta_y$ is input to the function ($\theta_y$ is defined as an angle error generated during an x-axis scanning) due to the assembling problem, and the angle error can cause the problem of spot rotation.

Regarding the problem of spot rotation, since it is difficult and complicated to gradually modify the scanning mirror system, an effective solving method is required to be developed.

SUMMARY OF THE INVENTION

The present invention is directed to a laser scanning device and a method using the same, in which an error is corrected from external to calibrate a spot rotation problem, so as to implement a real-time dynamic correction, and increase a processing speed. Moreover, a large area stitching can be accurately performed according to the calibrated projection spot.

The present invention provides a laser scanning device, comprising a laser output unit, a shape rotation unit, a scanning unit and a control unit. The laser output unit is used to output a laser beam. The shape rotation unit is disposed on a propagation path of the laser beam for rotating a spot of the laser beam by a predetermined angle. The scanning unit receives the laser beam whose spot has been rotated by the predetermined angle to scan a work piece set on a carrier unit. The control unit is coupled between the shape rotation unit and the scanning unit for generating the predetermined angle based on a scanning position of the scanning unit.

The present invention also provides a laser scanning method. In the method, a scanning position is detected. A rotation angle corresponding to the scanning position is obtained. A spot of a laser beam is rotated by the rotation angle. The laser beam whose spot has been rotated by the rotation angle is used to scan a work piece set on a carrier unit.

According to the laser scanning device and the method using the same, a real-time dynamic correction can be achieved without performing a complicated calibration to the scanning unit or the scan head system, so that a processing speed can be increased and a large area stitching can be accurately performed.

In order to make the aforementioned and other features of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the embodiments of the present invention, several feasible schemes are provided, by which an error can be corrected from external to calibrate a spot rotation problem, so as to carry out a real-time dynamic correction, and increase a processing speed. Moreover, a large area stitching can be accurately performed according to the calibrated projection spot.

Figure 1A:
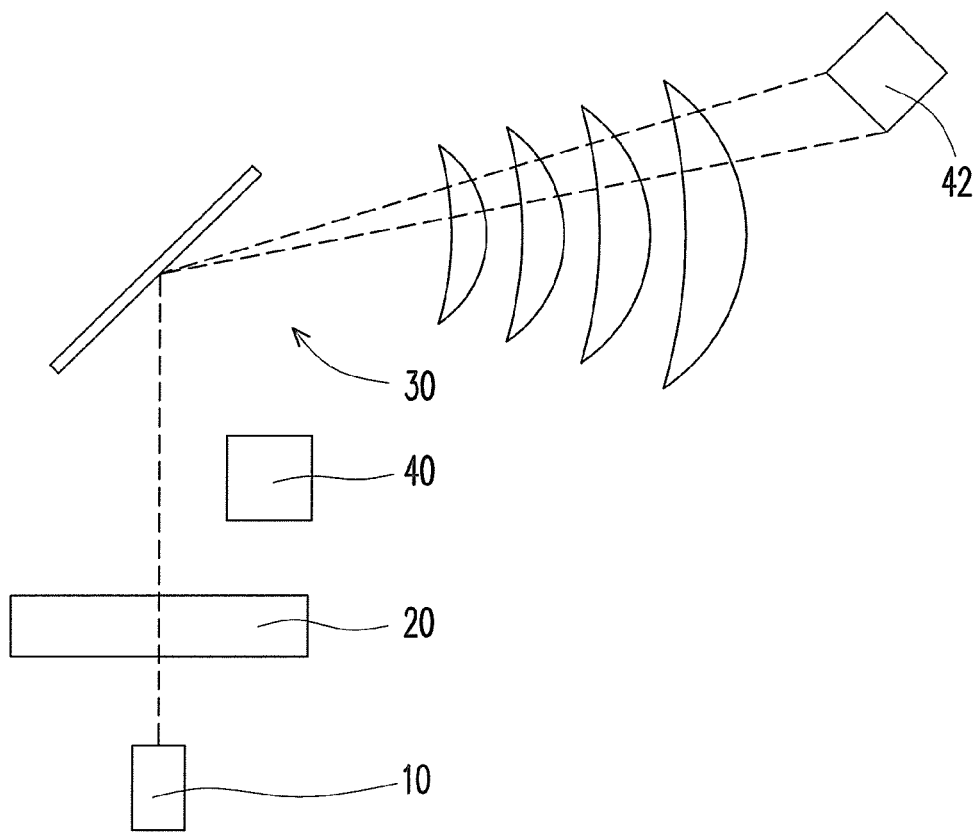
FIG. 1A and FIG. 1B are schematic diagrams illustrating a concept of spot rotation.
Figure 1B:
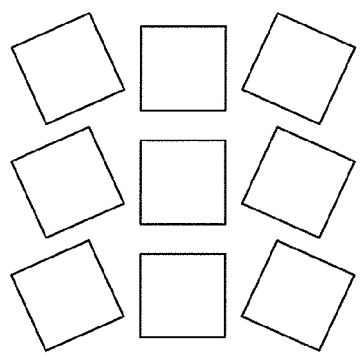

FIG. 1A and FIG. 1B are schematic diagrams illustrating a concept of spot rotation. After a laser beam is emitted from a laser output unit 10, the laser beam is shaped by a beam shaping unit 20 to obtain a spot 40 with a required shape.

Then, the shaped laser beam is incident to a laser scan head 30, and is used to scan a work piece (not shown) set on a carrier unit. A spot of the laser beam incident to the laser scan head 30 will be rotated to form a spot 42 due to the aforementioned assembling problem, etc. However, if such spot is used to perform the large area stitching, as that shown in FIG. 1B, splicing areas of the spots cannot be tightly stitched due to the spot rotation, which may greatly influence a fabrication process.

Figure 2A:
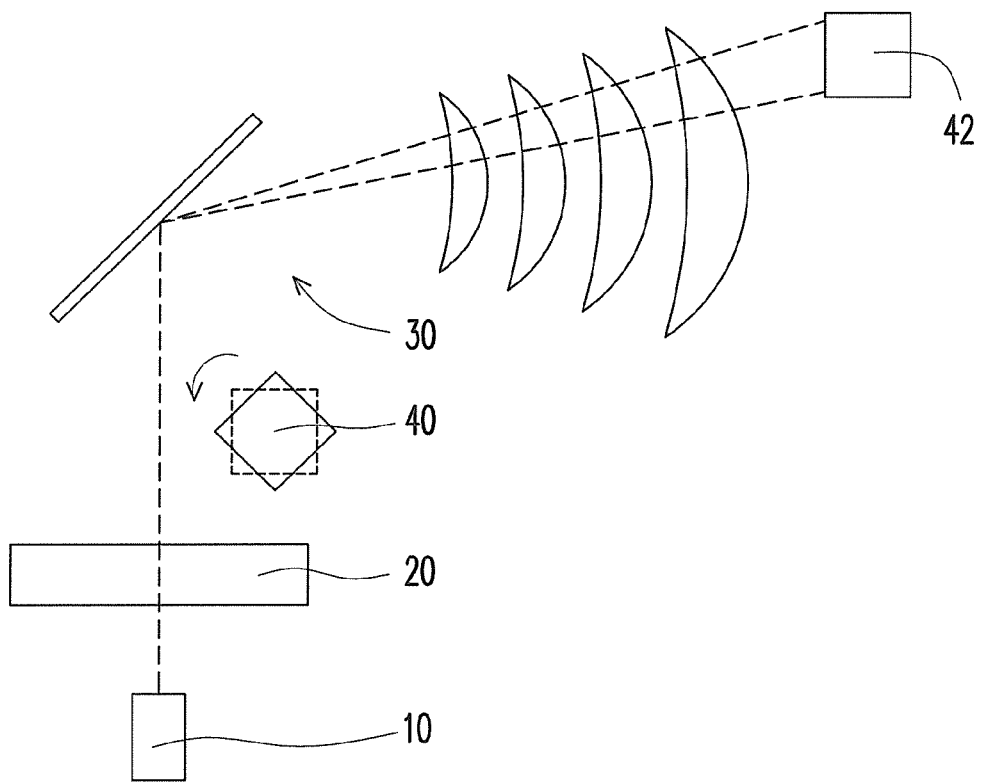
FIG. 2A and FIG. 2B are schematic diagrams illustrating a concept of spot correction according to an embodiment of the present invention.
Figure 2B:
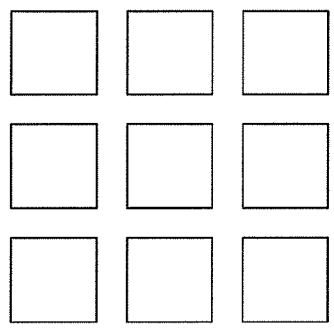

FIG. 2A and FIG. 2B are schematic diagrams illustrating a concept of spot correction according to an embodiment of the present invention. As shown in FIG. 2A, in the present embodiment, the laser spot 40 is pre-rotated by a predetermined angle to form a shape shown by dot lines. Then, after the laser beam passes through the laser scan head 30, the spot 42 is still rotated due to a mechanical problem of the laser scan head 30. Since the spot of the laser beam is pre-rotated by the predetermined angle before entering the laser scan head 30, the projected spot 42 can maintain an original state as if the laser beam is not affected by the laser scan head 30. When such spot is used for the large area stitching, a result shown in FIG. 2B is obtained, so that the problem of the spot rotation is avoided. A structure and an operation method of the laser scanning device are described in detail below.

Figure 3:
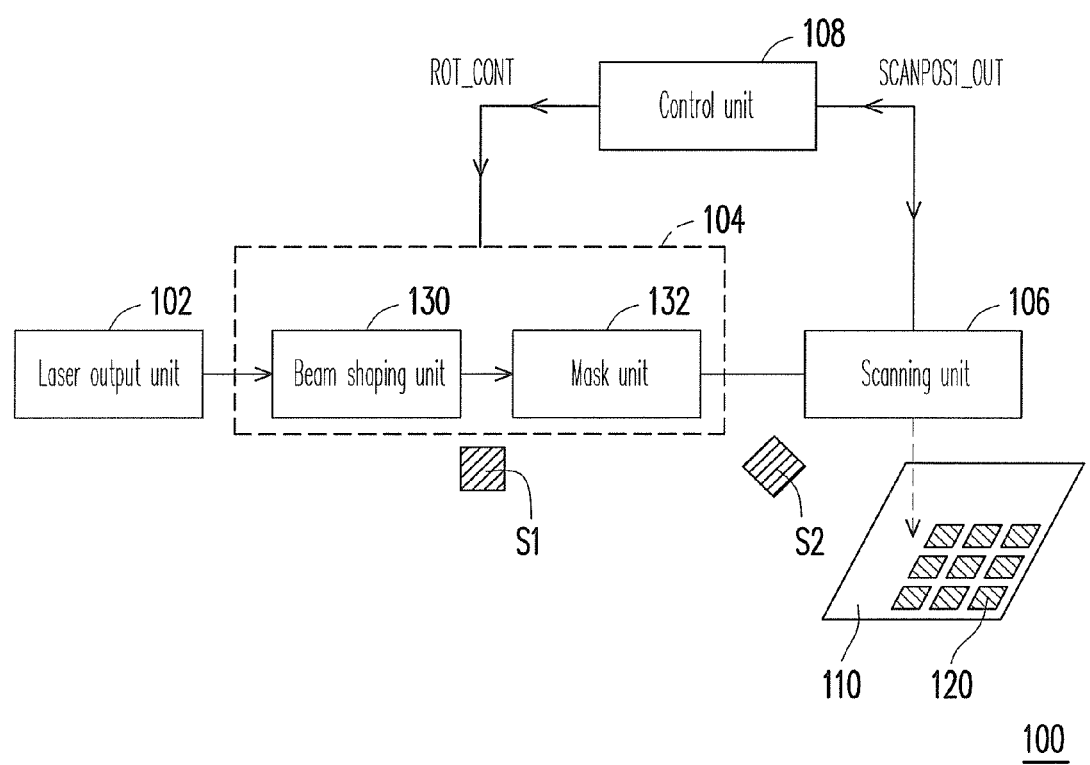
FIG. 3 is a structural schematic diagram illustrating a laser scanning device according to an embodiment of the present invention.

FIG. 3 is a structural schematic diagram illustrating a laser scanning device according to an embodiment of the present invention. Referring to FIG. 3, the laser scanning device of the present embodiment comprises a laser output unit 102, a beam shaping unit 130, a shape rotation unit 104, a scanning unit 106, a control unit 108 and a carrier unit 110.

The laser output unit 102 emits a laser beam, and then provides the laser beam to the scanning unit 106 behind for scanning a work piece set on the carrier unit 110. The laser output unit 102 can modulate energy of the laser beam or modulate a size of the spot. Moreover, as long as the above conditions can be fulfilled, type or wavelength of a laser source of the laser output unit 102 is not limited. The laser output unit 102 can be suitably chosen according to practice needs. In an embodiment, the wavelength of the laser beam can be ranged from 100 nm to 100000 nm, but not limited thereto.

Moreover, the laser beam emitted from the laser output unit 102 is further shaped by the beam shaping unit 130 shapes, so that the spot of the laser beam can be used by and fulfilled with the scanning unit 106 behind. The laser beam can be shaped based on a geometric shape or energy distribution of the laser beam. Speaking in detail, in addition to a shaped geometric shape, a spatial energy distribution of the laser beam passing through the beam shaping unit 130 is also adjusted. The shaped spot is depicted as S1 shown in FIG. 3, and a square spot is shown as an example. It should be noticed that the shape of the spot can be any geometric shape. The embodiment shows the exemplary square spot, but not limited thereto.

The shaped laser beam further passes through a mask unit 132, and a pattern of the mask unit 132 is projected onto the carrier unit 110 through the scanning unit 106, so as to scan the work piece set on the carrier unit 110.

The shape rotation unit 104 is disposed between the laser output unit 102 and the scanning unit 106, and can be implemented by any kind of rotation mechanisms. The shape rotation unit 104 can be driven manually, semi-automatically or full-automatically, etc. The driving scheme is not particularly limited in the present invention.

In the present embodiment, the shape rotation unit 104 is used for carrying the aforementioned beam shaping unit 130 and the mask unit 132. The shape rotation unit 104 is, for example, a rotation mechanism, which is used for rotating the carried beam shaping unit 130 and the mask unit 132, so that the shaped spot S1 is rotated by an angle to form a spot S2. The rotation angle is controlled by a control signal ROT_CONT output from the control unit 108. Detailed control methods are described later.

The scanning unit 106 comprises at least one rotation actuator and one laser scan head. The laser scan head is used for controlling a propagation direction of the laser beam, and the rotation actuator is used for rotating the laser scan head. The scanning unit 106 receives the laser beam output from the shape rotation unit 104, and the spot S2 of the laser beam is already rotated. The rotated laser beam scans the work piece set on the carrier unit 110 through the scanning unit 106. Now, an angle error of the scanning spot on the carrier unit 110 has been already eliminated. Moreover, the scanning unit 106 can further include an f-theta lens, and the f-theta lens is used for modulating a projection ratio of the pattern of the mask unit 132. In another embodiment, the f-theta lens is used for modulating a projection ratio of the spot.

In the present embodiment, the scanning unit 106 outputs a scanning position signal SCANPOSI_OUT to the control unit 108. The control unit 108 generates the control signal ROT_CONT to the shape rotation unit 104 according to the scanning position signal SCANPOSI_OUT, so as to rotate the spot. Moreover, in another embodiment, the control unit 108 can also directly detect the scanning position signal SCANPOSI_OUT.

In other words, in the present embodiment, a mechanical structure of the scanning unit 106 is not changed, but the control unit 108 controls the shape rotation unit 104 to pre-rotate the spot S1 by a corresponding angle to form the spot S2 according to a scanning position of the laser beam of the scanning unit 106. Since the spot S2 is reversely rotated in advance, when the rotated spot S2 is further rotated by the scanning unit 106, the spot S2 is recovered to a state the same to that of the shaped spot S1, i.e., the rotation effect of the laser beam caused by the scanning unit 106 is counteracted.

In other words, since the rotation error amount caused by the scanning unit 106 is a kind of angular variation, the shape rotation unit 104 can dynamically compensate the angle errors of different scanning positions in real-time.

Since the angle errors are eliminated according to the above control method, a spot stitch 120 performed on the carrier unit 110 can be the same as that shown in FIG. 2B, in which the spots of the scanning positions are not rotated, so that the projection spots projected through the scanning unit 106 can be used to accurately perform a large area stitching. It should be noticed that the large area refers to an area larger than that of the spot 51, or an area larger than the pattern of the mask unit 132.

Then, the shape rotation unit 104 of the present embodiment is described. In the above embodiment, the shape rotation unit 104 carries the beam shaping unit 130 and the mask unit 132, so that the two units can be rotated together, so as to rotate the emitted spot, i.e., the spot S2. According to such concept, the shape rotation unit 104 can be implemented by different approaches.

Figure 4A:
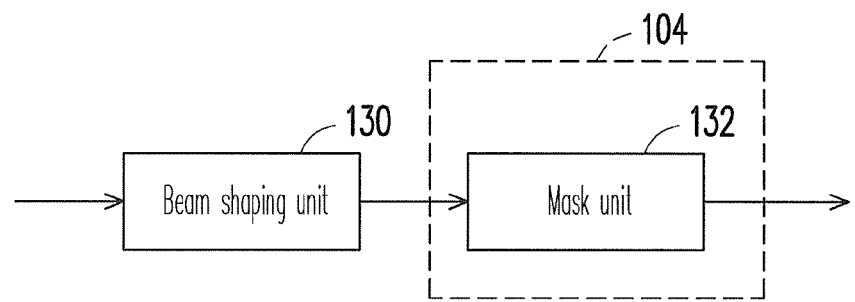
FIGS. 4A-4C are schematic diagrams illustrating implementations of a shape rotation unit.
Figure 4B:
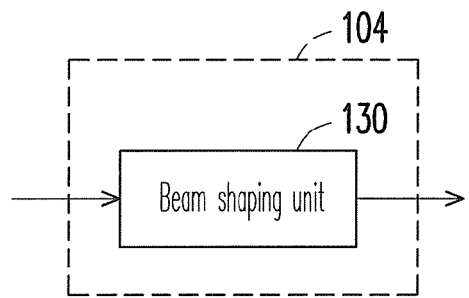
Figure 4C:
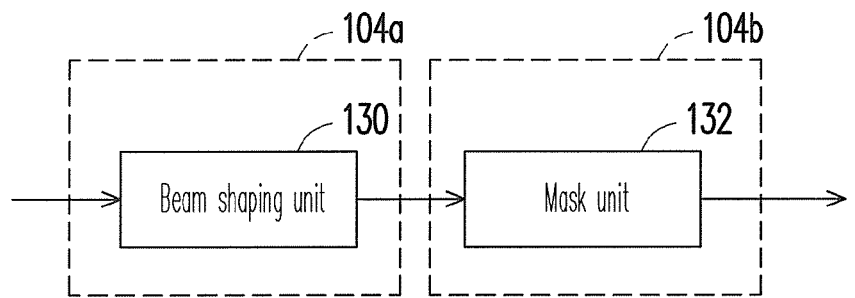

FIGS. 4A-4C are schematic diagrams illustrating several implementations of the shape rotation unit. In FIG. 4A, the shape rotation unit 104 is used together with the mask unit 132, i.e., the mask unit 132 is formed on the shape rotation unit 104. In FIG. 4A, the spot is rotated by rotating the mask unit 132.

FIG. 4B illustrates another variation. In some applications the mask is not necessary, and the mask unit 132 can be omitted. In this case, the beam shaping unit 130 is formed on the shape rotation unit 104. While the laser beam is shaped by the beam shaping unit 130, the shaped spot is further rotated by rotating the shape rotation unit 104. Then, the laser beam whose spot has been rotated is incident to the scanning unit 106, so as to scan the work piece set on the carrier unit 110.

FIG. 4C illustrates another applicable structure. The beam shaping unit 130 and the mask unit 132 can be respectively configured on shape rotation units 104a and 104b, so that the spot can be rotated by respectively rotating the beam shaping unit 130 and the mask unit 132.

The shape rotation mechanisms shown in FIG. 3 and FIGS. 4A-4C are only a part of applicable examples, which can be arbitrarily modified according to actual demands as long as the above described function is achieved.

Figure 5:
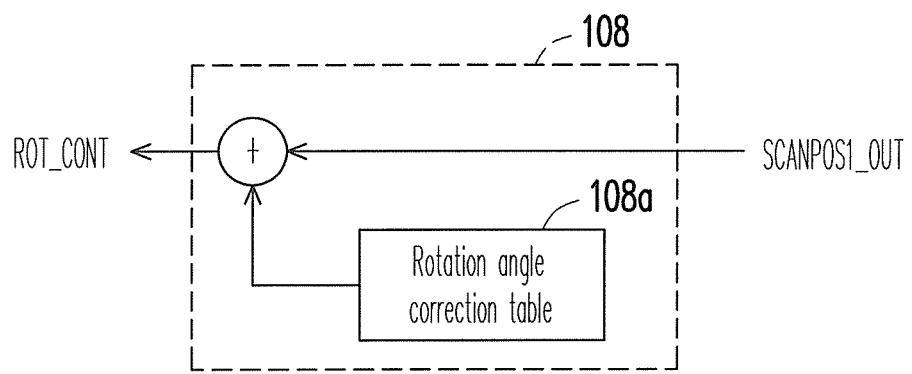
FIG. 5 is a structural schematic diagram illustrating a control unit of FIG. 3.

FIG. 5 is a structural schematic diagram illustrating the control unit of FIG. 3. Moreover, the control unit 108 illustrated in FIG. 5 is a simplified schematic diagram, in which only the components related to the present embodiment are illustrated, and other components used for implanting the control unit 108, such as a processor, a memory, a storage device, etc. can be varied according to actual design requirements, which is known by those with ordinary skill in the art, so that detailed descriptions thereof are not repeated.

As shown in FIG. 5, the control unit 108 at least has a rotation angle correction table 108a. The rotation angle correction table 108a can be, for example, a general look-up table (LUT), or can be implemented by other applicable manners. The LUT mainly stores a corresponding relationship between the scanning positions and the rotation angles. The rotation angle correction table 108a can be established while the laser scanning system is constructed.

The control unit 108 receives the scanning position signal SCANPOSI_OUT from the scanning unit 106, and accordingly obtains the corresponding rotation angle from the rotation angle correction table 108a, and outputs the control signal ROT_CONT to the shape rotation unit 104, so as to rotate the angle of the spot of the laser beam.

In this way, rotation of the spots projected on different scanning positions by the scan unit 106 can be avoided, so that the large area stitching can be performed.

Figure 6:
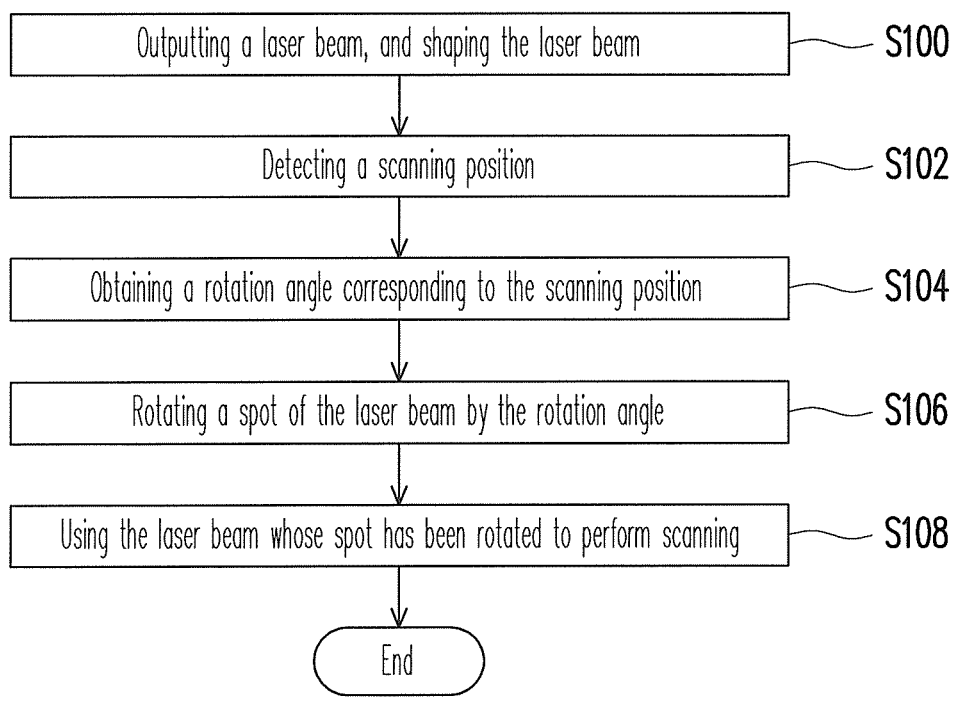
FIG. 6 is a flowchart illustrating a laser scanning method according to an embodiment of the present invention.

FIG. 6 is a flowchart illustrating a laser scanning method according to an embodiment of the present invention. Referring to FIG. 6 and FIG. 3, in step S100, the laser output unit 102 emits a laser beam, and the laser beam is shaped. Next, in step S102, the laser scanning device 100 detects or receives a scanning position signal from the scanning unit 106.

Next, in step S104, a correction value of a rotation angle is obtained according to the scanning position signal, where the rotation angle corresponds to the scanning position signal. This step can be executed by the control unit 108 of FIG. 3.

Moreover, a correction table (for example, the rotation angle correction table 108a shown in FIG. 5) can be established in advance according to the scanning positions and the corresponding spot rotation angles. Therefore, during the operation of the laser scanning device 100, the corresponding rotation angle can be obtained according to the obtained scanning position.

In step S106, the spot of the laser beam is rotated by the above rotation angle, and such step can be executed by the shape rotation unit 104 of FIG. 3. In this way, before the laser beam is incident to the scanning unit 106, the spot of the laser beam is reversely rotated.

In step S108, the laser beam whose spot has been rotated is incident to the scanning unit 106, and is used for scanning. Now, since the spot has been reversely rotated by the rotation angle, when the spot is further rotated by the scanning unit 106, a rotation effect of the spot are counteracted by such two rotations, so that the spot projected onto the work piece on the carrier unit 110 is not rotated.

By such means, the spots can be used to perform the large area stitching (splicing), and the problem of spot rotation shown in FIG. 1B that is generated during spot stitching can be avoided.

In summary, according to the laser scanning device and the method thereof provided by the present invention, the problem of spot rotation of the related art can be corrected through an external correction manner without performing a complicated calibration to the scanning unit or the mirror system. Moreover, a real-time dynamic correction can be achieved, so that a processing speed can be increased. In addition, the calibrated projection spots can be used to accurately perform the large area stitching.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A laser scanning device, comprising:
    a laser output unit, for outputting a laser beam, wherein the laser beam initially propagates out along a propagation path;
    a shape rotation unit, disposed on the propagation path of the laser beam, for rotating a spot of the laser beam by a predetermined angle about the propagation path and corresponding to an intended scanning position on a work piece but does not deflect the laser beam toward a different direction, wherein the spot has a polygon shape;
    a scanning unit, for receiving the laser beam whose spot has been rotated by the predetermined angle to scan the work piece set on a carrier unit; and
    a control unit, coupled between the shape rotation unit and the scanning unit, for generating the predetermined angle based on a scanning position of the scanning unit.

2. The laser scanning device as claimed in claim 1, further comprising a beam shaping unit disposed on the propagation path of the laser beam for shaping the laser beam.

3. The laser scanning device as claimed in claim 2, wherein the beam shaping unit shapes a geometric shape or an energy distribution of the laser beam.

4. The laser scanning device as claimed in claim 2, further comprising a mask unit disposed on the propagation path of the laser beam, so that the shaped laser beam projects a pattern of the mask unit onto the carrier unit through the scanning unit.

5. The laser scanning device as claimed in claim 2, wherein the beam shaping unit is disposed on the shape rotation unit, so that the spot of the laser beam is rotated by rotating the beam shaping unit.

6. The laser scanning device as claimed in claim 4, wherein the beam shaping unit and the mask unit are disposed on the shape rotation unit, so that the spot of the laser beam is rotated by simultaneously rotating the beam shaping unit and the mask unit.

7. The laser scanning device as claimed in claim 4, wherein the mask unit is disposed on the shape rotation unit, so that the spot of the laser beam is rotated by rotating the mask unit.

8. The laser scanning device as claimed in claim 4, wherein the shape rotation unit further comprises a first and a second rotation units for respectively carrying the beam shaping unit and the mask unit, so that the spot of the laser beam is rotated by rotating the beam shaping unit and the mask unit respectively.

9. The laser scanning device as claimed in claim 1, wherein the control unit further comprises a rotation angle correction table for storing the scanning position and a rotation angle corresponding to the scanning position.

10. The laser scanning device as claimed in claim 1, wherein the control unit directly detects the scanning position of the scanning unit.

11. The laser scanning device as claimed in claim 1, wherein a wavelength of the laser beam ranges from 100 nm to 100000 nm.

12. The laser scanning device as claimed in claim 1, wherein the shape rotation unit is driven manually, semi-automatically or full-automatically.

13. The laser scanning device as claimed in claim 1, wherein the scanning unit comprises a rotation actuator and a laser scan head, wherein the laser scan head is used for controlling the propagation path of the laser beam, and the rotation actuator is used for rotating the laser scan head.

14. The laser scanning device as claimed in claim 13, wherein the scanning unit further comprises an f-theta lens for modulating a projection ratio of the spot.

15. The laser scanning device as claimed in claim 4, wherein the scanning unit further comprises an f-theta lens for modulating a projection ratio of the pattern of the mask unit.

16. The laser scanning device as claimed in claim 1, wherein the laser output unit further modulates an energy of the laser beam.

17. The laser scanning device as claimed in claim 1, wherein the laser output unit further modulates a size of the spot of the laser beam.

18. A laser scanning method, comprising:
emitting a laser beam initially along a propagation path, and shaping the laser beam with a polygon shape;
detecting a scanning position;
obtaining a rotation angle about the propagation path of the laser beam, corresponding to the scanning position;
rotating a spot of the shaped laser beam by the rotation angle but not deflecting the laser beam toward a different direction; and
scanning a work piece set on a carrier unit through the laser beam whose spot has been rotated.

19. The laser scanning method as claimed in claim 18, further comprising:
pre-establishing a rotation angle correction table for recording the scanning position and the rotation angle corresponding to the scanning position.

20. The laser scanning method as claimed in claim 18, wherein the spot is rotated manually, semi-automatically or full-automatically.

21. The laser scanning method as claimed in claim 18, further comprising modulating an energy or a spot size of the laser beam.

22. The laser scanning method as claimed in claim 18, wherein a geometric shape or an energy distribution of the laser beam is shaped.

23. The laser scanning method as claimed in claim 18, wherein a wavelength of the laser beam ranges from 100 nm to 100000 nm.

24. The laser scanning method as claimed in claim 18, wherein the polygon shape is right-angle tetragon.

25. The laser scanning device as claimed in claim 1, the polygon shape is right-angle tetragon.

* * * * *